(12) United States Patent
Bird et al.

(10) Patent No.: US 7,010,517 B2
(45) Date of Patent: Mar. 7, 2006

(54) ORGANIZATION OF SQL WORKING MEMORY IN A TRANSACTION-BOUNDED PROCESSING ENVIRONMENT

(75) Inventors: Paul M. Bird, Markham (CA); Timothy J. Vincent, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 10/317,260

(22) Filed: Dec. 10, 2002

(65) Prior Publication Data
US 2003/0120643 A1      Jun. 26, 2003

(30) Foreign Application Priority Data
Dec. 21, 2001    (CA)    .................................... 2366192

(51) Int. Cl.
*G06F 17/30*      (2006.01)
(52) U.S. Cl. .................. 707/2; 707/101; 707/104.1
(58) Field of Classification Search ............ 707/103 R, 707/203, 2, 101, 102, 201, 104.1
See application file for complete search history.

(56) References Cited

U.S. PATENT DOCUMENTS

| | | | | |
|---|---|---|---|---|
| 5,553,282 A | * | 9/1996 | Parrish et al. ................. | 707/10 |
| 5,689,697 A | | 11/1997 | Edwards et al. ............ | 395/603 |
| 6,003,039 A | | 12/1999 | Barry et al. ................. | 707/103 |
| 6,374,252 B1 | * | 4/2002 | Althoff et al. .............. | 707/102 |

OTHER PUBLICATIONS

Alexander Balako, Client server based application in the Dyalog APL environment, pp. 24-31, ACM.*
Paul Bird, "A Method for Recogizing the Passage of Time with Respect to Stored Time Sensitive SQL Statements", Publication No. IPCOM000014396D, Jun. 19, 2003, pp. 1-4.

* cited by examiner

*Primary Examiner*—Jean M. Corrielus
(74) *Attorney, Agent, or Firm*—John L. Rogitz

(57) ABSTRACT

Working memory in an SQL database system is organized in workspaces. Agent workspaces are defined into which working copies of SQL executable logic information are loaded. Application workspaces are also defined for the loading of working copies of SQL executable logic information. Reference copies of the SQL information are available in a global SQL cache. An application SQL context data structure is used as an entry point to access working copies of SQL information in the agent or application workspaces. An application workspace is associated with an application and is maintained until the last application in the set is not active. An agent workspace is associated with an agent in the database system and is maintained until the agent is no longer active.

31 Claims, 3 Drawing Sheets

ORGANIZATION OF SQL WORKING MEMORY IN A TRANSACTION-BOUNDED PROCESSING ENVIRONMENT

I. FIELD OF THE INVENTION

This invention generally relates to computing systems and in particular to the organization of query working memory in transaction-bounded database processing environments.

II. BACKGROUND OF THE INVENTION

It is known for the architecture of a Relational Database Management System (RDBMS) to include agents. Agents are processes or threads defined and used by the database system to accept and process application requests made to the RDBMS. In a transaction-bounded relational database system such as the DB2® Universal Database RDBMS, an agent is associated with a single application for the duration of a transaction, or unit of work. On completion of a transaction, the associated agent is made available for use by other applications.

Typically, for each agent in the database system there is a set of information associated with the agent. Such information is used by the agent during processing of requests received by the agent from a given application and is collectively referred to as the agent's working memory. The organization of the contents of working memory for an agent will effect how efficiently an agent can be assigned to a new application. On the assignment of an agent to a new application, the content of the agent's working memory is loaded with information needed for the agent to execute requests from the new application. The steps carried out to set up the agent's working memory on the transfer of an agent from one application to another are an overhead cost in the operation of a database system.

It is therefore desirable to organize working memory in an RDBMS to permit agents to efficiently switch between applications. If the modification of the working memory when an agent is switched between applications can be avoided or minimized, a significant performance gain may be achieved.

SUMMARY OF THE INVENTION

According to an aspect of the present invention there is provided an improved method and system for the organization of query working memory in transaction-bounded processing environments. The query may be represented for example in the commonly used Structural Query Language (SQL) format.

According to another aspect of the present invention there is provided a query database management system, the system including a set of agents for executing requests received from one or more applications, the requests received by the agents including references to database system representations of query statement and query context information, the system further including means for defining and utilizing a set of agent workspaces, each agent workspace including a defined set of memory associated with an agent in the set of agents and capable of storing execution-ready representations of query statements, the agent workspace remaining associated with the agent for the lifetime of the agent, and means for defining and utilizing a set of application workspaces, each application workspace including a defined set of memory associated with a defined set of applications and capable of storing execution-ready representations of query statements, the application workspace remaining associated with the defined set of applications until the last application in the set of applications ceases to be connected to the system.

According to another aspect of the present invention there is provided the above system, further including means for defining and utilizing a set of application query context data structures, each application query context data structure representing an entry point for accessing information usable by one of the set of agents in association with one of the set of applications, the application query context data structure making available to the agent query statement information and query context information in the appropriate agent workspace and application workspace.

According to another aspect of the present invention there is provided the above system further including means for defining and utilizing a set of reference information including query statement representations and query context information, the set of reference information being accessible to the set of agents for copying into selected agent workspaces and application workspaces, as required, the reference information further including static information referable to by the set of application context data structures, the static information representing query context information that is unmodifiable during application execution.

According to another aspect of the present invention there is provided the above system in which each of the application workspaces and each of the agent workspaces have a common structure characterized by a first portion for storing a set of information relating to dynamic query statements and a second portion for storing information relating to static query statements.

According to another aspect of the present invention there is provided a query database management system in which query context and query statement information is maintained in a global query cache and is organized in a hierarchical arrangement of data structures including packages, section entries and sections, the system including means for defining and maintaining a set of application workspaces, a set of agent workspaces, and a set of application query context data structures, each of the agent workspaces and each of the application workspace being configurable to receive working copies of package, section entry and section information, each application query context data structure being configurable to receive copies of package and section entry information and to reference copies of package, section entry and section information in the global query cache, and in the associated agent workspace and application workspace.

According to another aspect of the present invention there is provided a computer program product for a query database management system, the system including a set of agents for executing requests received from one or more applications, the requests received by the agents including references to database system representations of query statement and query context information, the computer program product including a computer usable medium having computer readable code means embodied in said medium for organizing working memory, including computer readable program code means for defining and utilizing a set of agent workspaces, each agent workspace including a defined set of memory associated with an agent in the set of agents and capable of storing execution-ready representations of query statements, the agent workspace remaining associated with the agent for the lifetime of the agent, and computer readable program code means for defining and utilizing a set of application workspaces, each application workspace including a defined set of memory associated with a defined set of applications and capable of storing execution-ready representations of query statements, the application workspace remaining associated with the defined set of applications until the last application in the set of applications ceases to be connected to the system.

According to another aspect of the present invention there is provided the above computer program product, further including computer readable program code means for defining and utilizing a set of application query context data structures, each application query context data structure representing an entry point for accessing information usable by one of the set of agents in association with more of the set of applications, the application query context data structure making available to the agent query statement information and query context information in the appropriate agent workspace and application workspace.

According to another aspect of the present invention there is provided the above computer program product, further including computer readable program code means for defining and utilizing a set of reference information including query statement representations and query context information, the set of reference information being accessible to the set of agents for copying into selected agent workspaces and application workspaces, as required, the reference information further including static information referable to by the set of application context data structures, the static information representing query context information that is unmodifiable during application execution.

According to another aspect of the present invention there is provided the above computer program product in which each of the application workspaces and each of the agent workspaces have a common structure characterized by a first portion for storing a set of information relating to dynamic query statements and a second portion for storing information relating to static query statements.

According to another aspect of the present invention there is provided a computer program product for a query database management system in which query context and query statement information is maintained in a global query cache and is organized in a hierarchical arrangement of data structures including packages, section entries and sections, the computer program product including a computer usable medium having computer readable code means embodied in said medium for organizing working memory, including computer readable program code means for defining and maintaining a set of application workspaces, a set of agent workspaces, and a set of application query context data structures, each of the agent workspaces and each of the application workspaces being configurable to receive working copies of package, section entry and section information, each application query context data structure being configurable to receive copies of package and section entry information and to reference copies of package, section entry and section information in the global query cache, and in the associated agent workspace and application workspace.

Advantages of the invention include a database management system in which working copy representations of query statements may be reused and in which overhead associated with loading copies into working memory is reduced.

BRIEF DESCRIPTION OF THE DRAWINGS

In the accompanying drawings which illustrate the invention by way of example only.

Figure 1:
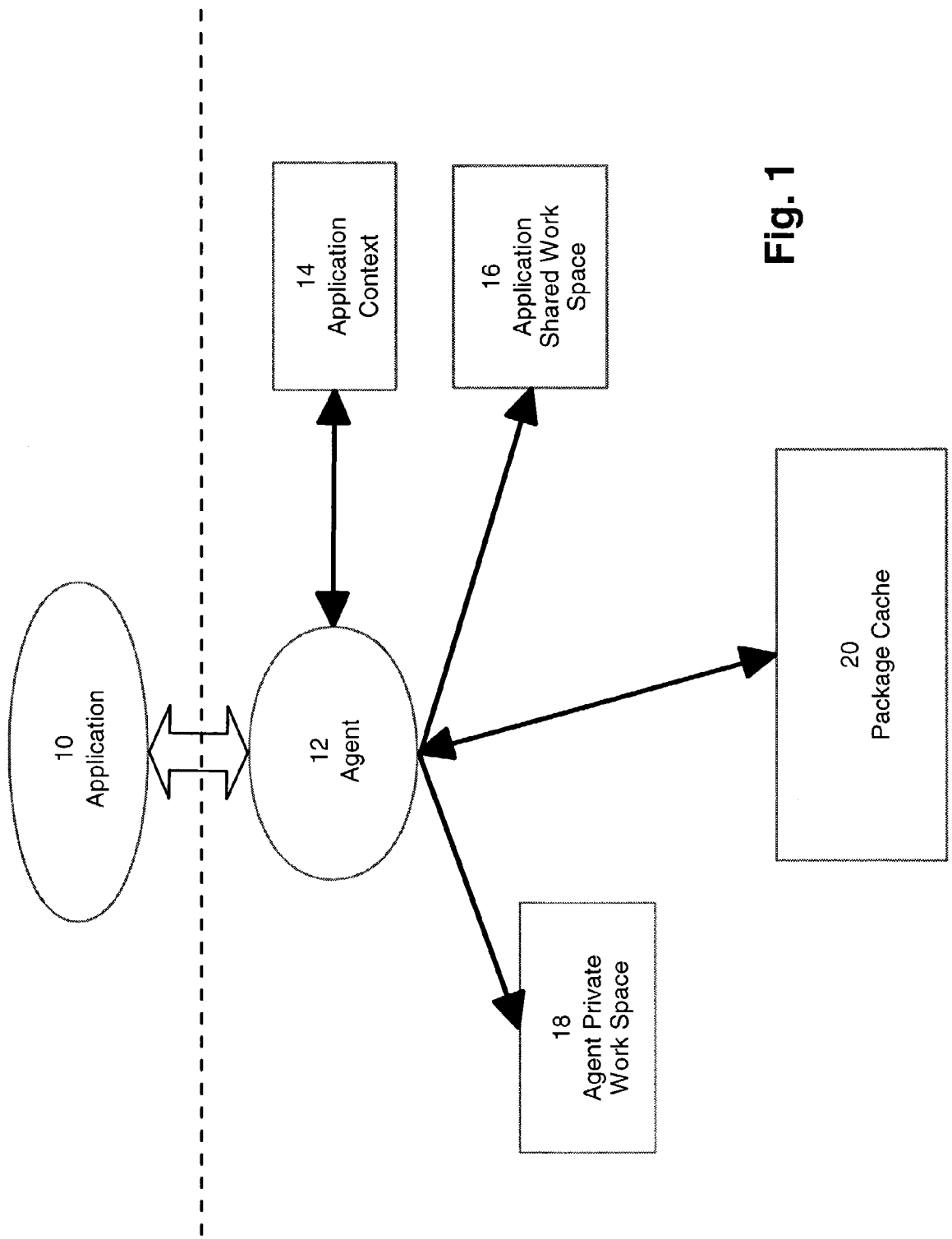
FIG. 1 is a block diagram showing components of an example configuration of processes and memory according to the preferred embodiment.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

FIG. 1 is a simple block diagram illustrating the preferred embodiment. In the example of FIG. 1, an application accessing data maintained by the RDBMS is shown as application 10. According to the preferred embodiment, access to data is provided to application 10 by the application sending a request to associated agent 12. Agent 12 is an agent running in the RDBMS. In the preferred embodiment, as is the case with the certain of the prior art, an agent is associated with an application for the duration of a unit of work (a transaction). At the completion of the transaction, if required, the agent may be associated with a different application seeking to make use of the RDBMS.

The database system of the preferred embodiment generates an internal representation of query (such as SQL) text defined in an application. The system has a working copy of the representation and a reference copy. The working copy can be modified during execution, while the reference copy remains unchanged. It is the working copies of SQL statements, and certain associated SQL context information, that are collectively referred to as forming a working memory for the agent with respect to requests from the application. The contents of the working memory will change over time.

In the database system of the preferred embodiment, representations of SQL application text, and associated SQL context information are stored using data structures including those referred to as packages, section entries, and sections.

Packages both directly include information relating to SQL context and also include section entries. In the preferred embodiment, a package is a data object that includes information about the default compilation environment of the sections that are associated with the package. The package SQL context information may include, for example, the optimization level to be used during compilation, whether blocking is to be used for eligible cursors during execution, and what degree of parallelism is to be used during execution of sections associated with the package.

As indicated above, in the database system of the preferred embodiment, packages have associated section entries. A section entry is associated with SQL statements in or referenced by an application. The section entry contains SQL context information that relates specifically to the associated SQL statements. Examples of this type of SQL context information are the cursor name and the information defining whether the SQL statements are static or dynamic. Section entries reference sections.

A section is an executable object that contains the logic needed to represent a specific SQL statement to the RDBMS. In the preferred embodiment, an SQL statement is "prepared" and the process of preparation generates the statement's corresponding section. This preparation process is also referred to as the compilation, or optimization, of the SQL statement. For static SQL statements, the section for the statement may be prepared at the pre-processing step. For dynamic SQL, the section is not generated until application runtime.

In FIG. 1, application SQL context 14, application shared workspace 16 and agent private workspace 18 are each defined portions of memory made available to agent 12 by the RDBMS of the preferred embodiment. As will be appreciated by those skilled in the art, a workspace is a logical construct that represents a defined set of memory available for use by, in this case, an agent in the database system during execution on application request.

As referred to above, in the preferred embodiment, sections are produced by an SQL compiler (provided as part of the RDBMS in the preferred embodiment) and are stored, in their uninitialized state, in cache 20. This embodiment uses a cache referred to as global SQL cache 20 which contains package, section entry and section data in a shared database-level cache memory.

A section is potentially first stored in an uninitialized state with internal references represented as offsets and any runtime buffers required by the section unallocated. In the process of rendering a section ready for execution, internal references are resolved, and runtime buffers are allocated. In the preferred embodiment, when a section is identified as being required to satisfy a request, the section is copied into a workspace and is made ready for execution. The original reference copy remains available to the database system but it is the copy in the workspace that will be used for execution purposes.

As indicated in FIG. 1, the preferred embodiment provides two types of workspaces in which sections may be stored. The division of these workspaces into shared and private portions provides for efficiencies in agent reallocation to new applications. Application shared workspace 16 (or application workspace) in FIG. 1 contains sections that must be made available to more than one agent of an application at the same time. For example, one type of section that is stored in the shared workspace is a section that requires multiple agents to concurrently process different parts of the same section at the same time. In the preferred embodiment, this workspace is associated with a defined group of applications for the life of that application group's association with the RDBMS. Agent private workspace 18 (or agent workspace), in contrast, stores those sections that do not need to be shared with other agents at the same time. An agent private workspace is associated with one and only agent for the life of that agent. As an agent is transferred from application to application, the agent's private workspace remains associated with it. The agent also will acquire access to the shared workspace used by the application it is currently servicing.

In addition, as is shown in FIG. 1 by application SQL context 14, for each application, there is also application SQL context information maintained by the RDBMS. The information in application SQL context 14 is essentially control information as well as a series of pointers to both static information stored in global SQL cache 20 and to the working copies of sections that are located in application shared work space 16 and agent private workspace 18. Application SQL context 14 includes pointers that associate individual initialized sections in workspaces 16, 18 with specific sections in global SQL cache 20 and associate other SQL context data maintained in application SQL context 14 with their appropriate reference copies also in global SQL cache 20.

As is shown in FIG. 1, both a shared workspace (application shared workspace 16) and a private workspace (agent private workspace 18) are used by a particular application-agent pair. The choice of workspace to be used to store the working copy of a particular section referenced by agent 12 will depend on the type of SQL statement represented by the section, the specific data in the application SQL context for the section, and the type of section that is generated for the statement. The preferred embodiment will, by default, assign sections to the agent's private workspace, unless there are factors that require the sections to be loaded in the shared workspace, instead.

For example, in the preferred embodiment, the following sections are loaded in the shared workspace:
1. any section that might potentially be accessed beyond the end of a transaction, such as WITH HOLD cursors;
2. any section referencing a declared global temporary table; and
3. any section that is potentially subject to a request giving rise to parallel processing, such as, in the preferred embodiment, a request containing a subsection distribution request. In such a case the section may be referenced by more than one agent at the same time.

For these types of sections, there are efficiencies in having the sections remain associated with the application, rather than with an agent.

As will be appreciated by those skilled in the art, examples of advantages achievable using the workspace design of the preferred embodiment include:
1. The memory allocations used for section storage can be treated as a distinct and different group than those memory allocations used for storing the application SQL context. This permits these two entities to be stored in different types of memory depending on the requirements of the processing environment. For example, in certain processing environments, working copies of sections are to be stored in private memory while the application SQL context information is stored in shared memory. In other processing environments, however, application SQL context information and some section copies may be kept in shared memory available to other agents. In yet other environments, application SQL context information may be stored in private memory such that it is not available to other agents. By defining the workspaces and application SQL context information as separate constructs, the database system of the preferred embodiment can be tailored to the characteristics of a given processing environment.
2. A common model of information arrangement can be used by an agent in all processing environments even when the actual memory usage requirements may differ for each individual agent. Each agent has available to it both a private and a shared SQL workspace which can be used by the agent in whatever proportion fits that agent's processing requirements. An agent may achieve greater efficiency or security by storing certain sections in private memory (and thereby preventing other agents from accessing those working copies of sections). Conversely, an agent may advantageously make a section available to other agents by locating the working copy of the section in shared memory, by way of the shared SQL workspace. Costs otherwise incurred to have an agent reorganize its internal use of memory to permit or deny access to working copies of sections can therefore be avoided in the preferred embodiment by permitting agents to define the location of sections in either the shared or private workspaces.

3. The preferred embodiment also facilitates the reuse of previously initialized sections within both the private and shared SQL workspaces within the same application and, between different applications. Once a section is loaded into a workspace memory location and is initialized, it remains in that workspace until it is no longer valid to be executed or the workspace requires the memory for another section.

As a result, a section can be reused one or more times within that workspace without incurring the cost of loading and initializing a new copy of the section (the preferred embodiment prevents reuse while a section copy in the workspace is being executed by an agent). An example of this reuse capability is when an application which happens to use the exact same statement in two different places in its logic. For a working copy of a section located in the shared SQL workspace, a different application that uses the same statement can reuse the existing working copy of a section that was placed in the workspace by a different application. As the private SQL workspace remains with the agent for the life of the agent, the potential reuse of sections within this workspace is available to each and every application that is serviced by that agent. For a shared SQL workspace, associated with a group of applications, the working copies of sections that are loaded in that workspace are available to all applications that are a member of that group.

To maximize the reuse potential, the internal organization of each workspace is built to mimic that of the source of uninitialized sections. For RDBMSs that support a global SQL cache, the internal organization of a workspace will utilize the same basic arrangement and identification mechanisms as the global cache. This permits accurate mapping of statements to requests and facilitates simplified processing logic. In the preferred embodiment, a global SQL cache, is used as the source of uninitialized sections. The global SQL cache is organized in two portions: one that caches static SQL statements (using an associated package and section entry number as a unique identifier) and one that caches dynamic SQL statements (each with a specified unique identifier).

As indicated above, due to the different storage mechanisms for static SQL statements and for dynamic SQL statements, the placement and organization of sections for each type of SQL statement in the SQL workspace of the preferred embodiment are different. In the preferred embodiment, a working copy of a section for a static SQL statement is associated with the specific section entry within a specific package as defined in the reference copy found in the global SQL cache. In contrast, a working copy of a dynamic SQL section is directly related to its master copy in the global SQL cache. Such a dynamic section is referenced by the unique ID of the master copy in the global SQL cache.

Figure 2:
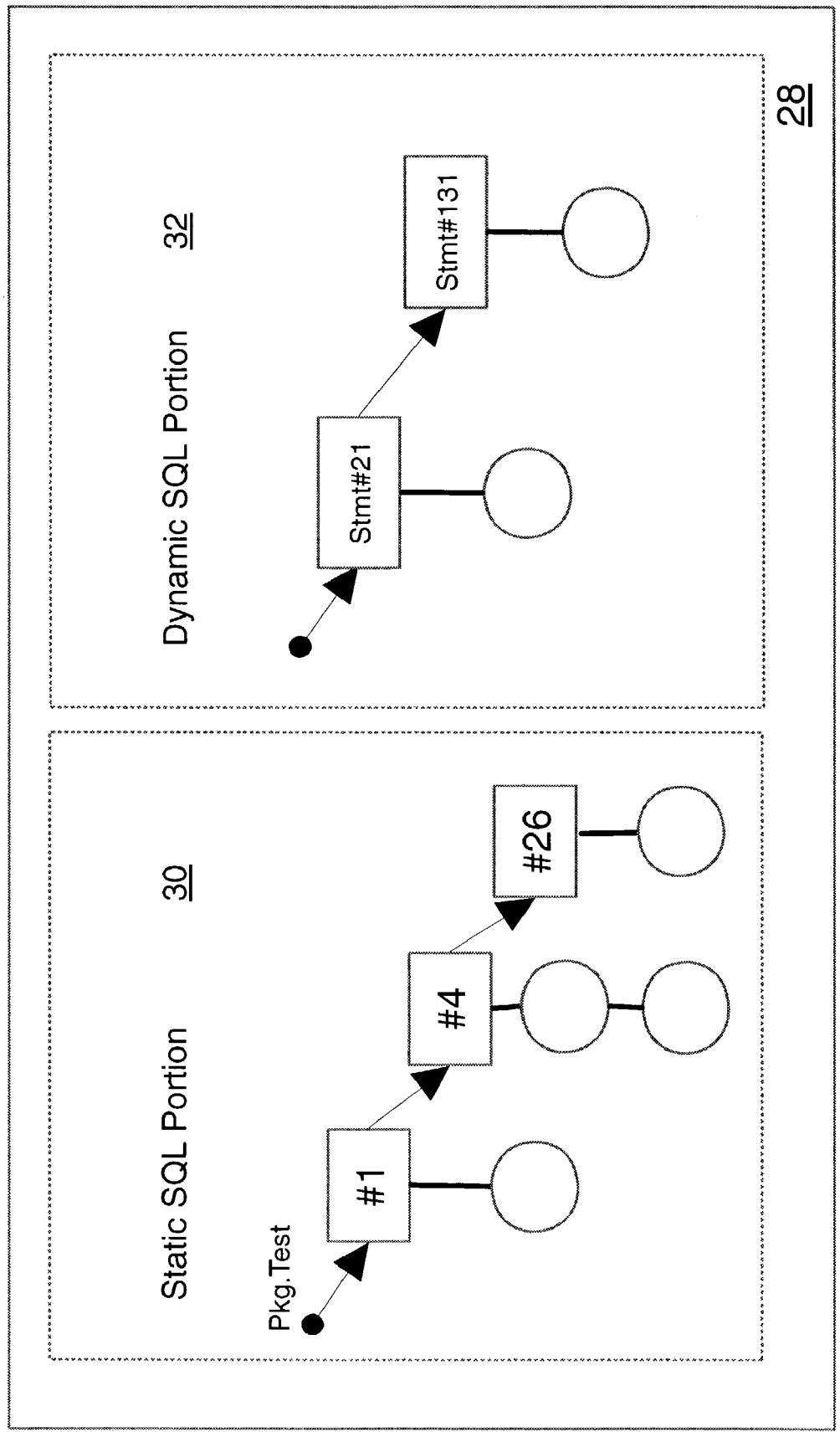
FIG. 2 is a block diagram showing an example workspace in accordance with the preferred embodiment.

The two different section reference structures are shown in the example of FIG. 2. FIG. 2 shows an example workspace 28. Workspace 28 may be either an application shared workspace such as application shared workspace 16 shown in FIG. 1, or an agent private workspace such as agent private workspace 18 shown in FIG. 1. Both types of workspace have the same two-part structure. This is shown in workspace 28 that has static SQL portion 30 and dynamic SQL portion 32. It will be appreciated that although FIG. 2 shows the two portions as being distinct and contiguous, other arrangements within workspace 28 are also possible where the portions are distinct and identifiable.

In the example of FIG. 2, static SQL portion 30 has sections referenced by the Pkg.Test package. Pkg.Test has section entries #1, #4, and #26. Each section entry has associated sections, shown in FIG. 2 by circular portions connected to the section entries indicated. Similarly, in dynamic SQL portion 32, statements #21 and #131 are shown referenced by a single entry point and each having an associated section.

In the preferred embodiment, the package and section entries in the workspace portion used for static SQL sections only contain the minimum information needed to uniquely identify the section. Other information pertaining to the static SQL sections are obtainable in the application SQL context or in the global SQL cache. As required, duplicate, or sibling, sections may be stored in the workspace under the same section entry under the same package.

Similarly, in the dynamic SQL section workspace, SQL statement entries contain the appropriate unique statement identifiers (sibling sections stored below each statement are further identifiable by their respective unique identifiers) with all other information to be found in application SQL context and the global SQL cache.

As may be seen from the above description, the application SQL context is the control point for SQL activity that occurs within an application's connection to the database system. In the preferred embodiment, the application SQL context includes or references the following information:

i. package control information (for example, lock information and state, package rebind information, and global SQL cache reference pointers)

ii. section entry control information for each active section at each execution layer (for example, cursor state, lock information, cursor attributes, global SQL cache reference pointers, type of section pointer to working copy of section, and the type of workspace that the section is stored in);

iii. SQL text submitted by the application. This information is associated with a specific package and section entry for the application SQL context;

iv. specific dynamic SQL sections information to permit its association with a specific package and section entry for the application SQL context; and v. control information for any declared global temporary tables.

In the preferred embodiment, the modifiable or volatile information about the SQL statement being executed is intended to be stored in the application SQL context. The section working memory and logic are stored in one of the SQL workspaces. Non-modifiable information about the SQL statement is stored in the global SQL cache and is referenced from there. Reference copies of packages and section entries actually used by an application are pointed to by the application SQL context.

Figure 3:
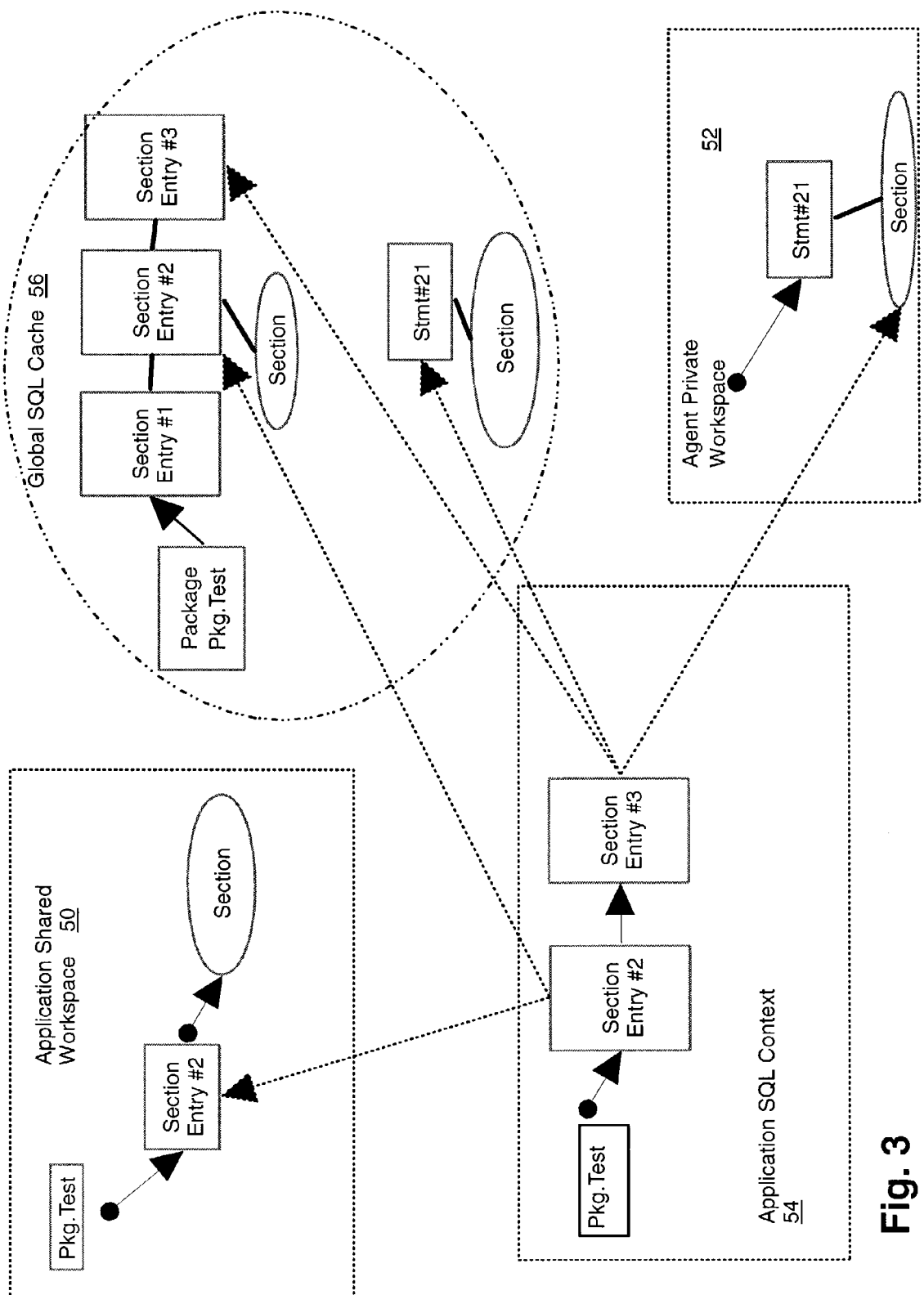
FIG. 3 is a block diagram showing the relationship between different memory components according to the preferred embodiment.

FIG. 3 shows an example in which the different structures referred to above are shown in use. FIG. 3 is a block diagram showing application shared workspace 50, agent private workspace 52, application SQL context 54 and global SQL cache 56. In the example of FIG. 3, an application has opened a static SQL Cursor defined as WITH HOLD using section entry #2 of package Pkg.Test. The application has also issued a dynamic SET CURRENT SCHEMA statement, identified within the global SQL cache as statement #21, via section entry #3 of the Pkg.Test package. The cursor definition represented by the static SQL statement includes the WITH HOLD clause which means that the cursor may remain open past the end of a transaction. For this reason, when an OPEN request is received for the cursor, the section for the cursor definition is loaded into the application shared workspace 50.

The dynamic SQL SET CURRENT SCHEMA statement is able to be loaded to agent private workspace 52 and is shown there as Statement #21 and related Section in FIG. 3.

FIG. 3 also shows a pointer from the working copy of the Pkg.Test package entry in application SQL context 54 to the reference copy of the corresponding package entry in global SQL cache 56.

As is shown in FIG. 3, the copies of section entry #2 and section entry #3 in application SQL context 54 contain pointers to the reference copies of the respective section entries in global SQL cache 56. In addition, the working copy of section entry #3 in application SQL context 54 points to a corresponding working copy of the section in agent private workspace 52. The working copy of a section associated with section entry #2 is shown loaded in application shared workspace 50.

The working copy of section entry #2 in application SQL context 54 points to the appropriate associated working copy in application private workspace 52. Not shown in FIG. 3, but present in the database system of the preferred embodiment, are pointers from the information in workspaces 50, 52 to the reference copies contained in global SQL cache 56.

The structure shown in FIG. 3, combined with the pointers referred to above, permits the agent seeking to make use of data in the workspaces 50, 52 to do so by way of application SQL context 54. Where the desired sections are found in workspaces 50, 52 (and are not currently in use), the section entry information in application SQL context 54 may be used to access the appropriate working copies of the sections directly. Where the sections are not already loaded in the appropriate workspaces, information may be copied from global SQL cache 56 to workspace 50 or workspace 52.

Although, for dynamic SQL statements, the text of SQL statements themselves (in contrast to the executable versions of the statements) may be stored directly in the application SQL context, such statements may alternatively be stored elsewhere. In the preferred embodiment, the statement itself is stored in the global SQL cache and is marked as not deletable while in use by the application. A pointer into the global SQL cache for the statement text is stored in the section entry information stored in the application SQL context. The SQL statement text in the global SQL cache is marked as deletable when the current statement is replaced with a different statement.

The manner in which application shared workspace 50, agent private workspace 52, application SQL context 54 and global SQL cache 56 are utilized in the RDBMS of the preferred embodiment is described in general as follows.

When a request from an application is received by an agent in the RDBMS, the agent accesses that application's SQL context, in this example application SQL context 54, to determine how to process the request. The request will specify a given package and section as the request context to be used. The package identifier will be used within application SQL context 54 to determine if the specified package is already loaded in the working memory. If the package is not loaded, the agent loads a working copy (shown as Pkg.Test in application SQL context 54) by copying a subset of the package information stored in the reference copy of the package located in global SQL cache 56.

A similar process is followed for the section entry specified in the application request. If the needed section entry is not loaded in application SQL context 54, global SQL cache 56 is accessed find the master copy of the section entry, a working copy is made and is associated with the working copy of the package in application SQL context 54.

If the section entry is for a static SQL statement, the agent determines whether a working copy of the section is associated with this section entry already (i.e. whether the section entry in the application SQL context already points to an initialized section in a workspace). If there is an initialized section entry associated with the section entry then the section is executed (if it is not in use).

If there is no section pointed to by the section entry, the master copy of the section is located in global SQL cache 56 and the type of section is determined so as to indicate whether the section will be located in application shared workspace 50 or in agent private workspace 52. The static SQL section area of the appropriate workspace is then searched to see if the section identified for this package and section entry combination is loaded there. If it is not or all the existing copies are in use by other applications, then the master copy of the section is initialized and copied from global SQL cache 56 to the target workspace (either application shared workspace 50 or agent private workspace 52).

Where the section entry specified by the application request is for a dynamic SQL statement there are two possibilities which are treated differently: the request is a PREPARE request or the request is an EXECUTE request.

If the request is a PREPARE request one of three possibilities will exist: there is a section entry with statement text and section associated with it, there is a section entry with no statement text and there is a section entry with text but no section associated with it.

If there is statement text associated with the section entry, the text of the request is compared with the section entry text. If the texts differ or the application environment has changed, the global SQL cache text is disassociated from the section entry, the existing text in the global SQL cache is released and the section, if there is one, is disassociated from the section entry.

If there is no statement text associated with the section entry, the text from the request is inserted into the global SQL cache and is marked as undeletable and the global SQL cache version is associated with the current section entry.

If there is no section associated with the section entry, the global SQL cache is searched and a match for the application's compilation environment and text is located. The agent then determines the type of section and thus, the workspace to be searched. The dynamic SQL section area of the appropriate workspace is searched to see if a section identified by the statement ID returned from the global SQL cache search is loaded there. If it is not, then the master copy of the section is located in the global SQL cache and the section is initialized and copied from the global SQL cache to the identified workspace.

If the request is an EXECUTE request, the above steps for a PREPARE request may be followed. This will occur if the compilation environment has changed, for example, if there is no section associated with the specified section entry. Otherwise the section associated with the section entry is identified as being ready for execution.

The above general description indicates the manner in which the data organization as shown in FIG. 3 may be used to specify sections for execution in the RDBMS of the preferred embodiment. As may be seen, the organization of agent workspace in the RDBMS of the preferred embodiment provides for efficient reallocation of agents to applications. Reuse of SQL working memory is made possible by the organization of workspaces into shared and private workspaces and by the removal of SQL context information from the workspaces. Although a preferred embodiment of the invention has been described above, it will be appreciated by those skilled in the art that variations may be made, without departing from the spirit of the invention or the scope of the appended claims.

We claim:

1. A query database management system, the system comprising plural agents for executing requests received from at least one application, the requests received by the agents comprising references to database system representations for a query statement and query context information, the system comprising:
   a. means for defining and utilizing agent workspaces, each agent workspace comprising a defined set of memory associated with an agent and capable of storing execution-ready representations of query statements;
   b. means for defining and utilizing a set of application workspaces, each application workspace comprising a defined set of memory associated with a defined set of applications and capable of scoring execution-ready representations of query statements; and
   means for defining and utilizing a set of application query context data structures, each application query context data structure being associated with an application and representing an entry point for accessing information usable by an agent in association with the application, the application query context data structure making available to the agent query statement information and query context information in the appropriate agent workspace and application workspace.

2. The system of claim 1, wherein the agent workspace remains associated with the agent for the lifetime of the agent, and the application workspace remains associated with the defined set of applications until the last application in the set of applications ceases to be associated with the system.

3. The system of claim 1 further comprising means for defining and utilizing a set of reference information comprising query statement representations and query context information, the set of reference information being accessible to the agents for copying into selected agent workspaces and application workspaces, as required, the reference information further comprising static information referable to by the set of application context data structures, the static information representing query context information that is unmodifiable during application execution.

4. The system of claim 1, wherein the system is an SQL system.

5. A query database management system, the system comprising plural agents for executing requests received from at least one application, the requests received by the agents comprising references to database system representations of a query statement and query context information, the system comprising:
   a. means for defining and utilizing agent workspaces, each agent workspace comprising a defined set of memory associated with an agent and capable of storing execution-ready representations of query statements; and
   b. means for defining and utilizing a set of application workspaces, each application workspace comprising a defined set of memory associated with a defined set of applications and capable of storing execution-ready representation of query statements, in which each of the application workspaces and each of the agent workspaces has a common structure characterized by a first portion for storing a set of information relating to dynamic query statements and a second portion for storing information relating to static query statements.

6. A query database management system in which query context and query statement information is maintained in a global query cache and is organized in a hierarchical arrangement of data structures comprising packages, section entries and sections, the system comprising:
   means for defining and maintaining a set of application workspaces, a set of agent workspaces, and a set of application query context data structures, each of the agent workspaces and each of the application workspace being configurable to receive working copies of package, section entry and section information, each application query context data structure being configurable to receive copies of package and section entry information and to reference copies of package, section entry and section information in the global query cache, and in the associated agent workspace and application workspace for facilitating executing, by agents operating in respective agent workspaces, queries from applications operating in respective application workspace.

7. The system of claim 6, wherein the system is an SQL system.

8. A computer program product for a query database management system, the system comprising a set of agents for executing requests received from one or more applications, the requests received by the agents comprising references to database system representations of query statement and query context information, the computer program product comprising a computer usable medium having computer readable code means embodied in said medium for organizing working memory, comprising:
   computer readable program code means for defining and utilizing a set of agent workspaces, each agent workspace comprising a defined set of memory associated with an agent in the set of agents and capable of storing execution-ready representations of query statements, and
   computer readable program code means for defining and utilizing a set of application workspaces, each application workspace comprising a defined set of memory associated with a defined set of applications and capable of storing execution-ready representations of query statements, in which each of the application workspaces and each of the agent workspaces have a common structure characterized by a first portion for storing a set of information relating to dynamic query statements and a second portion storing information relating to static query statements, the query statements being used by the agents.

9. The computer program product of claim 8, wherein the agent workspace remains associated with the agent for the lifetime of the agent, and the application workspace remains associated with the defined set of applications until the last application in the set of applications ceases to be associated with the system.

10. The computer program product of claim 9, further comprising
   computer readable program code means for defining and utilizing a set of application query context data structures, each application query context data structure being associated with an application and representing an entry point for accessing information usable by an agent in association with the application, the application query context data structure making available to the agent query statement information and query context information in the appropriate agent workspace and application workspace.

11. The computer program product of claim 10 further comprising computer readable program code means for defining and utilizing a set of reference information comprising query statement representations and query context information, the set of reference information being accessible to the set of agents for copying into selected agent workspaces and application workspaces, as required, the reference information further comprising static information referable to by the set of application context data structures, the static information representing query context information that is unmodifiable during application execution.

12. The computer program product of claim 8, wherein the database management system is an SQL system.

13. A computer program product for a query database management system in which query context and query statement information is maintained in a global query cache and is organized in a hierarchical arrangement of data structures comprising packages, section entries and sections, the computer program product comprising a computer usable medium having computer readable code means embodied in said medium for organizing working memory, comprising:
  computer readable program code means for defining and maintaining a set of application workspaces, a set of agent workspaces, and a set of application query context data structures, each of the agent workspaces and each of the application workspace being configurable to receive working copies of package, section entry and section information, each application query context data structure being configurable to receive copies of package and section entry information and to reference copies of package, section entry and section information in the global query cache, and in the associated agent workspace and application workspace for facilitating executing, by agents operating in respective agent workspaces, queries from applications operating in respective application workspaces.

14. The computer program product of claim 13, wherein the database management system is an SQL system.

15. A query database management system, comprising:
  plural agents for executing at least one request received from at least one application, the request received by agents comprising references to database system representations of at least one of: at least one query statement, and query context information;
  plural agent workspaces, at least one agent workspace including at least one memory element associated with at least one respective agent, at least one agent workspace being configured for storing execution-ready representations of query statements; and
  plural application workspaces, at least one application workspace including at least one memory clement associated with at least one respective application, at least one application workspace being configured for storing execution-ready representations of query statements, wherein each of the application workspaces and each of the agent workspaces has a common structure characterized by a first portion for storing a set of information relating to dynamic query statements and a second portion for storing information relating to static query statements.

16. The system of claim 15, wherein at least one agent workspace remains associated with at least one respective agent for a lifetime of the respective agent and at least one application workspace remains associated with at least one respective application until the respective application ceases to be associated with the system.

17. The system of claim 15, wherein the system is an SQL system.

18. A query database management system, comprising:
  plural agents for executive at least one request received from at least one application, the request received by agent comprising references to database system representations of at least one of: at least one query statement, and query context information;
  plural agent workspaces, at least one agent workspace including at least one memory element associated with at least one respective agent, at least one agent workspace being configured for storing execution-ready representations of query statements; and
  plural application workspaces, at least one application workspace including at least one memory element associated with at least respective application, at least one application workspace being configured for storing execution-ready representations of query statements, wherein the system is configured for defining and utilizing a set of application query context data structures, each application query context data structure being associated with an application and representing an entry point for accessing information usable by an agent in association with the application, the application query context data structure making available to the agent query statement information and query context information in the appropriate agent workspace and application workspace.

19. The system of claim 18, wherein the system is configured far defining and utilizing a set of reference information comprising query statement representations and query context information, the set of reference information being accessible to the agents for copying into selected agent workspaces and application workspaces, as required, the reference information further comprising static information referable to by the set of application context data structures, the static information representing query context information that is unmodifiable during application execution.

20. A query database management method, the method using at least one agent for executing requests received from at least one application, the requests received by agents comprising at least one reference to database system representations of query statement and query context information, the method comprising:
  a. defining and utilizing agent workspaces, each agent workspace comprising a defined set of memory associated with an agent and capable of storing execution-ready representations of query statements;
  b. defining and utilizing a set of application workspaces, each application workspace comprising a defined sea of memory associated with a defined set of applications and capable of storing execution-ready representations of query statements; and
  defining and utilizing a set of application query context darn structures, each application query context data structure being associated with an application and representing an entry point for accessing information usable by an agent in association with the application, the application query context data structure making available to the agent query statement information and query context information in the appropriate agent workspace and application workspace.

21. The method of claim 20, wherein the agent workspace remains associated with the agent for the lifetime of the agent, and the application workspace remains associated with the defined set of applications until the last application in the set of applications ceases to be used.

22. The method of claim 20 further comprising defining and utilizing a set of reference information comprising query statement representations and query context information, the set of reference information being accessible to the agents for copying into selected agent workspaces and application workspaces, as required, the reference information further comprising static information referable to by the set of application context data structures, the static information representing query context information that is unmodifiable during application execution.

23. The meted of claim 20, wherein the query statement is an SQL statement.

24. A query database management, the method using at least one agent for executing requests received from at least one application, the requests received by agents comprising at least one reference to database system representations of query statement and query context information, the method comprising:
   a. defining and utilizing agent workspaces, each agent workspace comprising a defined set of memory associated with an agent and capable of storing execution-ready representations of query statements; and
   b. defining and utilizing a set of application workspaces, each application workspace comprising a defined set of memory associated with a defined set of applications and capable of storing execution-ready representations of query statements, in which each of the application workspaces and each of the agent workspaces has a common structure characterized by a first portion for storing a set of information relating to dynamic query statements and a second portion for storing information relating to stark query statements.

25. A query database management method in which query context and query statement information is maintained in a global query cache and is organized in a hierarchical arrangement of data structures comprising packages, section entries and sections, the method comprising:
   defining and maintaining a set of application workspaces, a set of agent workspaces, and a set of application query context data structures, each of the agent workspaces and each of the application workspace being configurable to receive working copies of package, section entry and section information, each application query context data structure being configurable to receive copies of package and section entry information and to reference copies of package, section entry and section information in the global query cache, and in the associated agent workspace and application workspace for facilitating executing, by agents operating in respective agent workspaces, queries from applications operating in respective application workspaces.

26. The method of claim 25, wherein the query database is an SQL database.

27. A query database management method, comprising:
   executing plural agents to generate at least one request received from at least one application, the request received by an agent comprising references to database representations of at least one of: at least one query statement, and query context information;
   associating at least one memory element of at least one agent workspace with at least one respective agent, at least one agent workspace being configured for storing execution-ready representations of query statements;
   associating at least one memory element of at least one application workspace with at least one respective application, at least one application workspace being configured for storing execution-ready representations of query statements; and
   defining and utilizing a set of reference information comprising query statement representations and query context information, the set of reference information being accessible to the agents for copying into selected agent workspaces and application workspaces, as required, the reference information further comprising static information referable to by the set of application context data structures, the static information representing query context information that is unmodifiable during application execution.

28. The method of claim 27, wherein at least one agent workspace remains associated with at least one respective agent for a lifetime of the respective agent and at least one application workspace remains associated with at least one respective application until the respective application ceases to be associated with the system.

29. The method of claim 28, comprising defining and utilizing a set of application query context data structures, each application query context data structure being associated with an application and representing an entry point far accessing information usable by an agent in association with the application, the application query context data structure making available to the agent query statement information and query context information in the appropriate agent workspace and application workspace.

30. The method of claim 27, wherein the request is an SQL request.

31. A query database management method comprising:
   executing plural agents to generate at least one request received from at least one application, the request received by an agent comprising references to database representations of at least one of: at least one query statement, and query context information;
   associating at least one memory element of at least one agent workspace with at least one respective agent, at least one agent workspace being configured for storing execution-ready representations of query statements; and
   associating at least one memory element of at least one application workspace with at least one respective application, at least one application workspace being configured for storing execution-ready representations of query statements, wherein each of the application workspaces and each of the agent workspaces has a common structure characterized by a first portion for storing a set of information relating to dynamic query statements and a second portion for storing information relating to static query statements.

* * * * *